June 26, 1956
E. S. SMITH
2,751,941
TUBULAR POWER SAW
Filed June 22, 1953
3 Sheets-Sheet 1
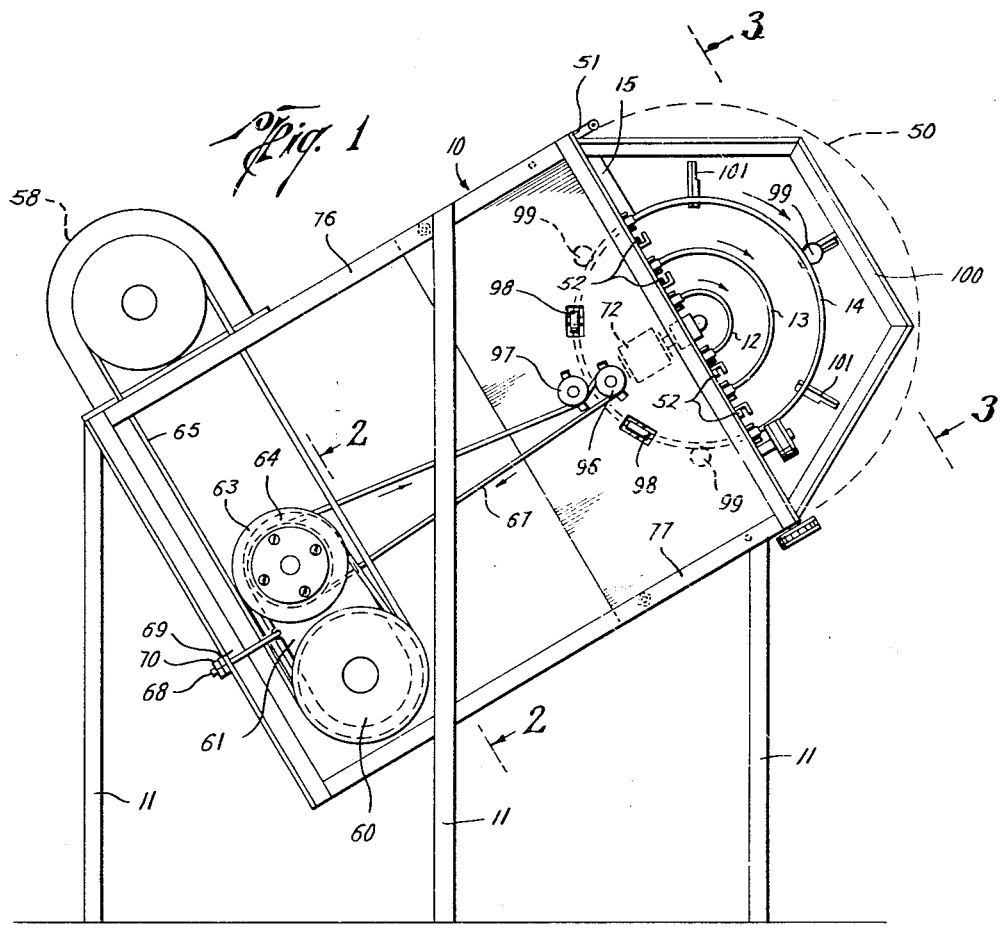
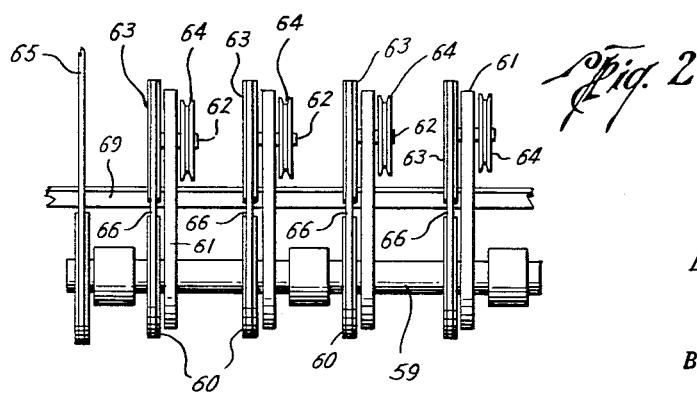
Egmont S. Smith
INVENTOR.
BY Browning & Simms
ATTORNEYS

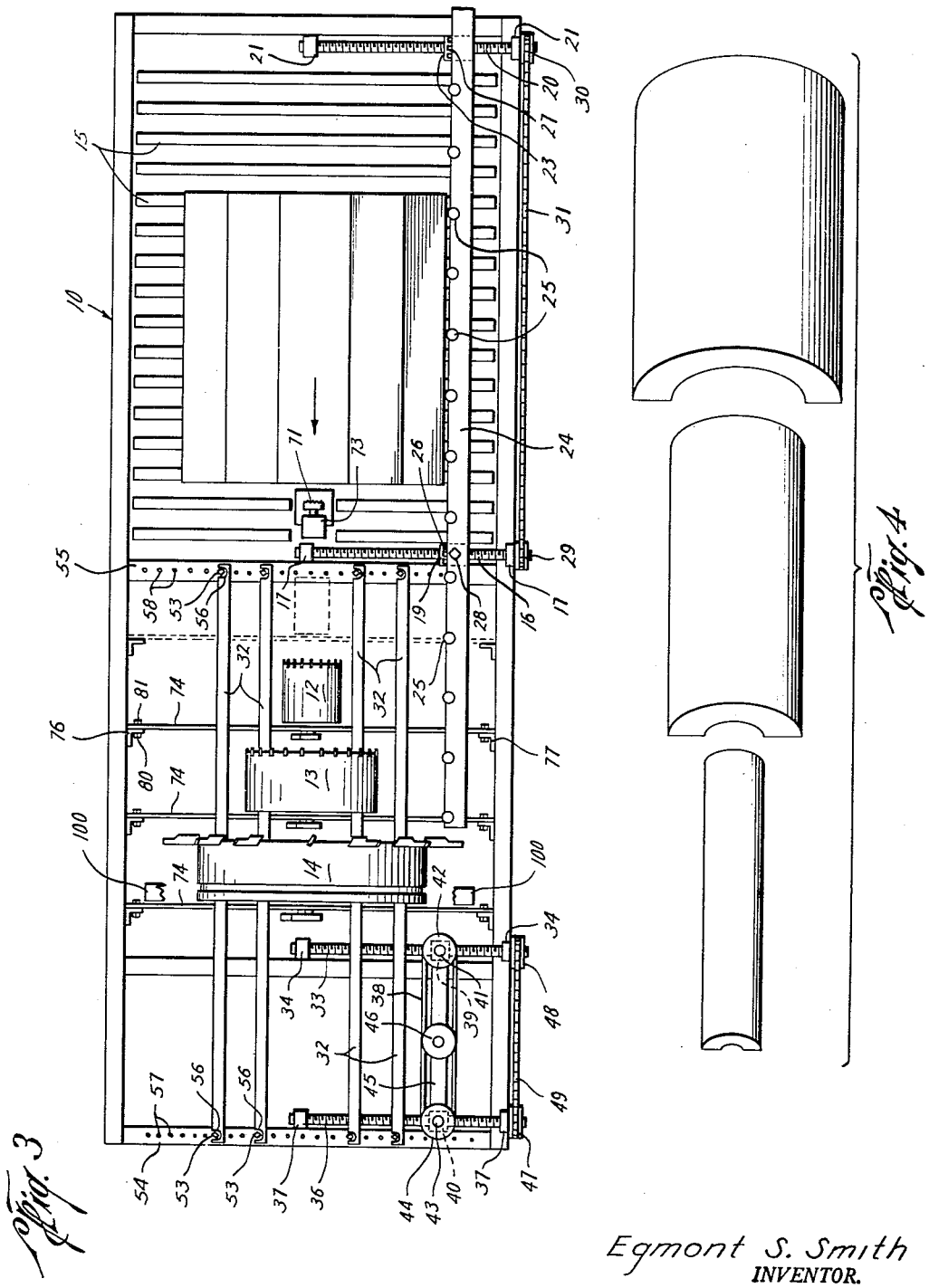

June 26, 1956  E. S. SMITH  2,751,941
TUBULAR POWER SAW
Filed June 22, 1953  3 Sheets-Sheet 3
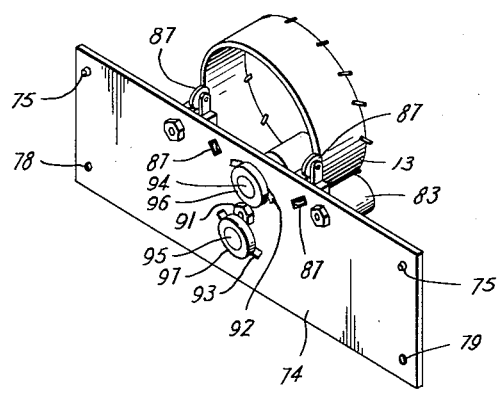
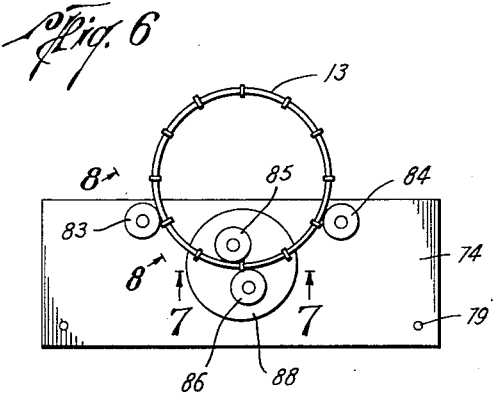
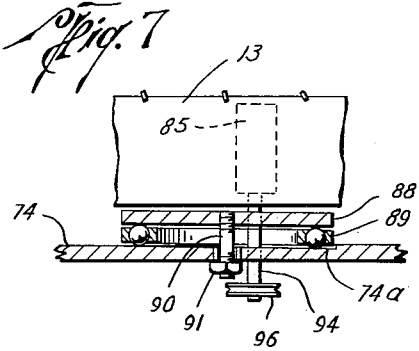
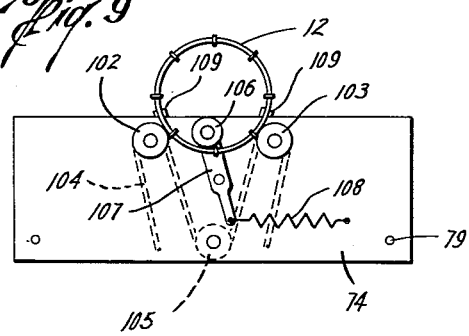
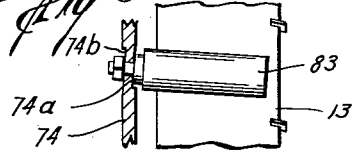
Eqmont S. Smith
INVENTOR.
BY Browning & Simms
ATTORNEYS

United States Patent Office 2,751,941
Patented June 26, 1956

2,751,941

TUBULAR POWER SAW

Egmont S. Smith, Houston, Tex., assignor to B. & B. Engineering & Supply Company, Inc., Houston, Tex., a corporation of Texas Application June 22, 1953, Serial No. 363,059

15 Claims. (Cl. 143—85)

This invention relates to an improved tubular sawing apparatus for making an arcuate cut, and in one of its aspects, to a means for positioning and rotating a tubular saw blade.

In the manufacture of insulating materials, such as polymerized styrene which has been expanded into a solid foam-like structure, cork or other materials which cannot readily be moulded as an insulating covering for pipes, conduits, and the like, it is desirable to form the material in blocks and then to shape the blocks of material to fit about such pipes or the like by sawing them into arcuate segments. It is further desirable that several segments of different diameters be cut from a single block so that the insulating material will not be wasted.

In providing saws for cutting insulating material into arcuate segments, there are several desirable objectives which should be attained. In order to reduce wastage of material to a minimum, the thickness of the blade should be small to avoid cutting a large kerf in the block of insulating material. Also, the blade must be arranged so as to be supported and driven without cuttings from the sawed material interfering with its operation. In so arranging the blade, it is desirable that the axis of rotation of the tubular saw be located at the surface of the work table in which the saw is mounted to provide a half-circle segment of the saw exposed above the work surface for cutting the half-circle segments of material. With the saw thus located, the thrust resulting from pushing material into the exposed half of the saw blade must be balanced by some arrangement to prevent cocking of the blade. Further centrifugal force tends to hold cuttings against the inner circumferential face of the saw blade and any rollers contacting such face to support or drive the blade will pass over these cuttings and, if a suitable arrangement is not provided, the rollers will tend to shift the saw blade from its proper position. This tendency is even more pronounced when very long saw blades are used. Also, any support and drive rollers should exert no greater force on the saw blade than is necessary to perform their intended function. This is particularly important in large diameter saws having a blade of desirably small thickness because excessive roller force on such saw blades tends to distort the blades.

It is an object of this invention to provide a tubular saw having the advantageous features discussed above.

Another object is to provide a tubular saw in which driving and positioning rollers engage the saw blade along an arcuate segment of less than 180° so that the remainder of the periphery of the saw blade is free to perform its sawing function and in which the saw blade may be very thin and yet remain undistorted due to heavy sawing loads.

Another object is to provide a tubular saw in which the saw blade is held against thrust resisting means by rollers which engage a circumferential face of the saw blade.

Another object is to provide a tubular saw in which the force urging the drive rollers into engagement with the saw blade is increased as resistance to rotation of the saw blade is increased.

Another object is to provide a tubular saw in which wear of the peripheral surfaces of the drive rollers may be compensated for without movement of the tubular saw from its appointed rotative position.

Another object is to provide a tubular saw in which a roller which is in engagement with the inner face of the saw may pass over cuttings without shifting the axis of rotation of the saw blade.

Other objects, advantages and features of this invention will be apparent to one skilled in the art upon a consideration of the specification, the claims and the attached drawings.

In the drawings, wherein like reference numerals indicate like parts and wherein there is shown by way of illustration one embodiment of this invention:

Fig. 1 is an end view of an apparatus embodying this invention;

Fig. 2 is a view along the line 2—2 of Fig. 1 taken in the direction of the arrows;

Fig. 3 is a view taken along the line 3—3 of Fig. 1 in the direction of the arrows;

Fig. 4 is an illustration of three half segments of insulating material which may be obtained by passing a single block of insulating material through the illustrated apparatus;

Fig. 5 is a rear perspective view of a tubular saw assembly showing the blade and its supporting driving assembly;

Fig. 6 is a front end view of the saw assembly illustrated in Fig. 5;

Fig. 7 is a view taken along the line 7—7 of Fig. 6 in the direction of the arrows;

Fig. 8 is a view taken along the line 8—8 of Fig. 6 in the direction of the arrows; and Fig. 9 is an end view of a tubular saw blade and drive assembly therefor which can be utilized in making short radius cuts.

The saw illustrated is provided with a plurality of tubular saw blades which are positioned with their axes of rotation lying in the plane of a table top or work surface to provide substantially a 180° arc of each saw blade above the work surface. The several saw blades are of different diameters to provide for the cutting of a single block of insulating material into several half-circle segments such as those illustrated in Fig. 4. Guides are positioned to form a V-shaped trough aligned with the cutting edge of the saw blades so as to provide a means for guiding a block of material to be cut properly into the saw blades. At the trailing edge of the last saw blade there is provided a receiving mechanism to maintain the alignment of the segments as they leave the saws.

The tubular saw blades are rotatably supported by a plurality of rollers, some of which may act as drive rollers to rotate the saw blade. In accordance with one feature of this invention, at least one of such rollers is fixed against axial movement and has its rotative axis inclined or cocked relative to the rotative axis of the saw blade so that upon rotation of the roller and blade, the tendency of the roller to move axially along the blade due to its inclination results in an axial thrust being exerted on the blade. This thrust can be resisted by suitable means having circumferentially spaced points of contact with the blade, such spacing being designed so that the blade is maintained in a fixed rotative position despite the fact that material being sawed along only a portion of the periphery of the blade may exert a large axial thrust on the blade tending to cock it out of its normal position.

As another feature of this invention, a pair of relatively closely spaced rollers, at least one of which is a drive roller, may be employed to rotate the saw blade in such a manner that the force urging these rollers into contact with the saw blade varies with the power required to drive the saw blade. In such an arrangement, these rollers are pivoted for respective movement toward and away from the inner and outer circumferential surfaces of the tubular saw blade. A power belt is so connected to such rollers that as the tension in the belt increases with increased load on the saw blade, the rollers are pivoted into tighter engagement with the saw blade. Such an arrangement permits of partially automatic and easily adjustable compensation for wear of the drive rollers. Also, since the rollers need be separated by a distance only slightly greater than the thickness of the saw blade, they provide a back-up for each other thereby minimizing and virtually eliminating distortion of the tubular saw blade due to the force of a drive roller bearing thereagainst.

The machine illustrated includes a framework, indicated generally at 10, which is supported by uprights 11 thereby providing a work surface tilted approximately 60° from the horizontal. While the work surface of the framework can be positioned at a lesser angle, it is desired to position it at as large an angle with the horizontal as possible so that cuttings from the saw blades will slide off the table under the influence of gravity and not interfere with the operation of the machine.

Saws 12, 13 and 14 are carried by the framework for rotation about a common axis which preferably lies in the plane of the work surface. With the exception of the O. D. saw blade 14, the assembly for positioning and driving the blades is located along the 180° segment of the blades below the work surface and within the framework. The O. D. blade can have a roller positioned along the portion of the blade above the table as will be hereinafter more fully explained, but this roller does not interfere with the sawing of material as the O. D. saw blade shaves the outer periphery of the block of insulating material and no part of the block passes over the outer circumferential face of the O. D. saw blade. Thus, a block of insulating material can be passed through saw blades having 180° cutting edge exposed to the material without such material striking any obstruction. Where several saw blades are utilized as in the illustrated saw, all of the saw blades rotate about a common axis and can be spaced along such axis. The common rotational axis arrangement permits the cutting of half-circle segments from the material being sawed with the inner and outer surfaces of the segments concentric with each other. By spacing the saw blades along their common axis it is possible to mount each saw blade independently of the others and one or more of the saw blade assemblies can be easily removed and interchanged with another saw blade assembly having a blade of a greater or lesser diameter.

In order to facilitate movement of the material to be sawed along the work surface of table 10, conveyor rollers 15 are journaled in the framework to form a portion of the work surface. These rollers are journaled for rotation about an axis perpendicular to the axis of rotation of the saw blades.

An adjustable side guide or fence is provided to properly align and guide the blocks of material into the saws. Thus, threaded shafts 16 and 20 are rotatably journaled in the frame at 17 and 21 respectively. Nuts 19 and 23 are threaded to these shafts and are movable therealong by rotation of the shafts. Shafts 20 and 16 are positioned at the leading and trailing edges, respectively, of the conveyor rollers with their axes extending parallel to the axis of rotation of the conveyor rollers. A guide 24, which is provided with rollers 25, is hinged to nuts 19 and 23 by hinges 26 and 27 respectively.

With this arrangement, the work surface and guide 24 provide a V-shaped trough for guiding a block of material to be cut into the saw blades. Since the work surface is tilted, the weight of the block of material tends to maintain it in the V-shaped trough thereby increasing the ease with which it can be moved into the saws. In the event the angle formed by the sides of the block of material which are to engage conveyor rollers 15 and guide rollers 25 is less than 90°, guide 24 can be pivoted about hinges 26 and 27 by screwing down on a positioning bolt 28 which is threadedly received in guide 24 and bears against nut 19.

Shafts 16 and 20 are provided with chain sprockets 29 and 30, respectively, which are interconnected by a continuous chain 31. By movement of chain 31, nuts 19 and 23 can be caused to travel along shafts 16 and 20 to adjust the position of guide 24 on the work surface.

It will be noted in Fig. 3 that guide 24 terminates adjacent O. D. saw blade 14. Also, angle members 32 are positioned in the same plane as the rollers 15, as illustrated by one roller shown in Fig. 1, and form a continuation of the work surface. In such a manner there is provided a support and guide for the block of material being sawed as it passes along saws 12 and 13 and until its trailing edge enters O. D. saw 14. The inner diameter saws 12 and 13 should be positioned in front of the O. D. saw to take the fullest advantage of this guide feature.

At the trailing or back edge of O. D. saw 14, there is provided a receiving guide means which, in some respects, is similar to feeding guide 24. This receiving guide means engages a side of the segment of material sawed by O. D. saw blade 14 after such segment leaves the saw and functions to guide such segment along a path parallel to the rotational axis of blade 14. To provide such a receiving guide means, threaded shafts 33 and 36 are journaled in the frame at 34 and 37, respectively. The shaft 33 is positioned closely adjacent the back edge of the O. D. saw and the shaft 36 is positioned some distance therefrom. Shafts 33 and 36 are provided with threaded nuts 39 and 40, respectively, which carry stub shafts 41 and 43. Pulleys 42 and 44 are mounted on shafts 41 and 43. Bar 45 is journaled at its extremities to stub shafts 41 and 43 and extends therebetween to support a pulley 46 at a point substantially midway between pulleys 43 and 44. The pulleys 42, 44 and 46 are mounted in a line behind the back edge of the O. D. saw 14 and are interconnected by a belt 38. As the largest half-circle segment of sawed material leaves the O. D. saw, one of its sides contacts belt 38 and the latter is free to move with the segment thereby providing a guide for the segment. To adjust the position of the receiving guide relative to blade 14 while maintaining it parallel to the axis of the blade, sprockets 47 and 48 are mounted on shafts 36 and 33 and are connected by chain 49.

As will be more fully apparent below, O. D. saw 14 cuts away the outer portions of the block of material being sawed to the desired shape of the largest segment's outer surface. This results in cuttings being thrown from the saw at high velocity. A cover 50 which is shown in dashed outline in Fig. 1, deflects these cuttings and prevents injury to the machine operator. Cover 50 is shaped in the form of a half-circle having a larger radius than the O. D. saw and is hinged to the frame at 51. Gravity normally retains the cover in operative position. Hinge 51 allows the cover to be moved into an out of the way position when it is desired to remove the O. D. saw.

Referring again to angle members 32, it will be noted that the outermost pair of members 32 extend through saw 14 and that the two innermost members 32 extend through both saws 13 and 14. In order that these saws can be quickly and easily removable, it is desired that members 32 be quickly detachable from the frame. Accordingly, plate 52 (Fig. 1) is welded or otherwise secured to the extremities of members 32 so that the latter can be bolted, as by bolts 53 (Fig. 3), to frame members 54 and 55. The angle members 32 are cut away as at 56 above plates 52 to provide access to the bolts. Frame members 54 and 55 can be provided with a plurality of holes 57 and 58 to permit adjustment in the position of angle members 32. These angle members provide a continuation of the work surface and support the individual segments of sawed material as they are cut from the block of insulating material. It will be noted that the spacing apart of angle members 32 provides for the easy removal of cuttings from the table as they tend to move across the upper face of members 32, which are tilted relative to the horizontal, and fall between the angle members.

A drive system is provided for connecting each of the saws to a motor 58. Such system includes drive shaft 59 which has mounted thereon a plurality of pulleys 60, one pulley being provided for each of the saws. Arms 61 are pivotally connected to shaft 59 and each has idler pulleys 63 and 64 mounted on a shaft 62 which is rotatably received in the free end of arm 61. Belt 65 is provided between the motor and drive shaft 59, which in turn rotates idler pulleys 63 and 64 through belts 66. Belts 67 are received about pulleys 64 and other pulleys for driving the saw blades as will hereinafter be more fully explained.

Each of the arms 61 is pivotally connected to one end of a take up bolt 68 which extends through frame member 69. The free end of bolt 68 has a nut 70 which can be taken up to draw arm 61 toward frame member 70 thereby tightening belts 67. This arrangement also provides a ready means for disengaging belts 67 from the saw blade assemblies in order that the assemblies can be quickly removed and to as quickly engage pulleys of substitute saw blade assemblies and to tighten belts 67 to the desired tension.

The inner radius of the smaller segment to be cut from a block is often small enough that it is possible to use a milling tool instead of a tubular saw blade. In such cases milling tool 71 (Fig. 3) which is driven by motor 72 (Fig. 1) through gear box 73, may be employed.

Each of the tubular saw blades is carried by a removable frame 74. Frames 74 are provided with lugs 75 (Fig. 5) which are positioned to fit in holes in frame members 76 and 77 (Fig. 3). The frames are additionally provided with holes 78 and 79 for receiving bolts 80 to firmly fasten the frames to frame members 76 and 77. It will be noted that as viewed in Fig. 3, frames 74 are positioned to the right of frame members 76 and 77 to which they are attached so that forces set up by passage of the block through the saws will tend to urge frames 74 more tightly against frame members 76 and 77. With this arrangement the two studs and the two bolts securing frames 74 to frame members 75 and 76 are sufficient to hold a saw blade assembly in place.

Referring now to the individual saw blade assemblies, that is, frame 74, the saw blade, and the positioning and driving rollers therefor, it will be noted that there are three types of saws utilized in the apparatus shown. These three types of saws may be classified generally as saws having a diameter of less than 6 inches, saws of an intermediate size having a diameter of 6 to 12 inches, and large saws having a diameter of 12 inches or larger.

While these three types of saws have many common features, there are some different considerations involved in each. For instance, when force is applied along a short segment of a tubular saw blade to rotate it, care must be exercised to prevent any appreciable distortion of the blade. On the other hand, it is highly desirable to utilize saw blades which are as thin as possible to eliminate wide kerfs. With saw blades of approximately 6 inches and less in diameter, distortion gives very little trouble even with thin blades due to the short arcuate length of the cut being made by the saw and due to the relatively high rigidity of the blade in which the thickness of the blade is comparatively large relative to its diameter. With a blade having a diameter greater than 6 inches, distortion presents a problem and if the blade is thin, say ⅛ of an inch, some provision must be made to prevent distortion of the blade by the drive rollers employed to rotate the blade.

O. D. blade 14 may also be treated somewhat differently as its thickness is not as critical as the inner diameter blades 12 and 13 because the O. D. blade does not pass between two segments of sawed material and hence, its thickness can be as great as necessary to prevent distortion.

Referring first to the intermediate size saw blade, the details of which are illustrated in Figs. 5 through 8 of the drawings, frame 74 is provided with a plurality of positioning rollers arranged about an arcuate segment of the saw blade constituting less than one-half of its circumference thereby leaving the remaining circumferential segment free for sawing. Such rollers rotatably support the saw blade by bearing thereagainst. One of these rollers can take the form of an elongate roller 83 and is positioned closely adjacent the end of the half circle segment of the saw blade which lies below the work surface of the table and another positioning roller may take the form of a similar elongate roller 84 and is positioned in a like manner at the other end of the half segment of the saw blade which lies below the work surface of the table. Rollers 83 and 84 can be positioned to engage either the inner or outer circumferential face of saw blade 13 but it is preferred they engage the outer face as cuttings tend to leave the outer face of the saw blade under the influence of centrifugal force whereas the same force tends to maintain cuttings on the inner face of the blade. Therefore, any reduction in the number of rollers which engage the inner face of the blade is highly desirable.

Preferably rollers 83 and 84 are fixed against axial movement and are journaled for rotation about axes which intersect a plane containing the rotative axis of the saw blade and which are inclined with respect to such plane. With the rollers so positioned, a given point on the surface of the rollers will move toward frame 74 during the time it is in engagement with the saw blade. This will result in a force urging the saw blade axially toward frame 74. Preferably, rollers 83 and 84 are surfaced with a resilient material having a high coefficient of friction, such as rubber or the like, to better exert this force and to support the saw blade on a yielding surface which will allow cuttings to pass between the rollers and saw blade without causing appreciable movement of the saw blade from its proper position. The inclination of rollers 83 and 84 can be achieved by milling frame 74 to provide opposite and inclined surfaces 74a and 74b in opposing faces of frame 74 as shown in Fig. 8. The rollers will then extend at a right angle to these inclined surfaces and hence will be inclined relative to frame 74 and the saw blade. The angle of incline of surfaces 74a and 74b is exaggerated in Fig. 8 for purposes of illustration and in actual practice, the angle is considerably smaller.

Other positioning rollers for the saw blade can take the form of thrust rollers 87 to provide means for resisting axial movement of the saw blade. Thrust rollers 87 are arranged about the arc of less than 180° and rotatably engage an endwise surface of the saw blade, such as its back edge, to prevent axial movement of the saw blade along its rotational axis by the forces set up by rollers 83 and 84 or by material being cut by the blade.

Drive means are provided for rotating the saw blade which will prevent distortion of the blade due to the force exerted thereon to rotate it, such as the force exerted by a roller in engagement with the saw blade, and in which wear of a drive roller can be easily compensated for without moving the saw blade from its appointed position.

The drive means includes a roller support in the form of a rotatable plate 88 connected to frame 74 by stud shaft 90, the latter being journaled in the frame to permit the plate to rotate about an axis which extends longitudinally of the saw blade. A ball bearing 89 is positioned between the rotatable plate and frame and nut 91 is threadedly received on the end of shaft 90 to hold the rotatable plate against the ball bearing and the ball bearing against frame 74. It will be noted that the frame has an inclined surface 74a against which the ball bearing bears so that plate 88 is also inclined relative to frame 74 and the axis of the saw blade. Frame 74 is provided with arcuate slots 92 and 93 positioned to either side of stud shaft 90. Shafts 94 and 95 are journaled in rotatable plate 88 at points equidistant from stud shaft 90 and pass through slots 92 and 93 respectively. One end of shafts 94 and 95 are provided with pulleys 96 and 97 and drive rollers 85 and 86 are mounted on the other ends of the shafts. In this manner, rotation of pulleys 96 and 97 will drive rollers 85 and 86. The drive rollers are provided with a wear face of resilient material having a high coefficient of friction such as rubber to prevent slippage and to allow cuttings to pass between a roller and the blade without moving the blade from its appointed position. If a sufficient amount of cuttings collect on the inner face of the saw, there will be some tendency of the rotatable plate to rotate about its axis to allow passage of the cuttings between the rollers and the blade but usually the resilient surface of the rollers will yield sufficiently to allow passage of cuttings between a roller and blade without substantial movement of the rotatable plate.

It will be noted that the rotational axis of shafts 94 and 95 and the rotational axis of rotatable plate 88 all lie in a single plane and the wear face of drive rollers 85 and 86 are spaced apart a distance just sufficient to receive the thickness of the saw blade therebetween. With this arrangement, slight rotation of the rotatable plate about its axis will result in movement of drive rollers 85 and 86 into rolling engagement with the saw blade at points on the inner and outer circumferential faces of the blade which are separated by only a small arcuate length of the blade whereby the rollers act as back-ups for each other.

Referring to Fig. 1, the mode of threading pulleys 96 and 97 by drive belt 67 is illustrated. It will be noted that idler pulley 64 which is also threaded to drive belt 67 is so positioned relative to rotatable plate 88 that belt 67 is threaded about a little more than half of pulley 96 and about a lesser portion of pulley 97. With this arrangement, the tension of belt 67 tends to rotate the rotatable plate to move the drive rollers into tighter contact with the saw blade at the same time that it rotates both pulleys 96 and 97. As the resistance to rotation of the saw blade is increased, belt tension increases on its pulling side which tends to rotate rotatable plate 88 still further thereby increasing the bearing force of the drive rollers on the saw blade. Thus the friction between rollers 96 and 97 and the saw blade will be commensurate with that required to drive the saw blade. It will be appreciated that the force applied by these rollers and tending to distort the saw blade into an out-of-round shape will be negligible due to the rollers providing a back-up for each other. That is, distorting forces exerted on the saw blade by roller 96 are opposed by equal forces applied by roller 97 in substantially an opposite direction. As these rollers are arranged as close together as possible, the distorting forces tending to distort the saw blade act substantially opposite to each other and are balanced out without reducing the frictional contact between the drive rollers and the saw blade. It is only necessary to use pulley 96 to obtain this result, but pulley 97 is desirable as it substantially increases the area of contact between the drive belt and drive pulleys and gives an additional torque to assist in rotating the rotatable plate about its axis.

Referring now to the large diameter saw blades, one of which is illustrated in Fig. 1 in the form of O. D. blade 14, the principal difference between the intermediate and large saw blades is in the provision of additional thrust rollers 98 which are carried by frame 74 and three thrust rollers 99. Thrust rollers 99 are journaled for rotation on axes which are parallel to the axis of rotation of the saw blade and run in a shallow groove provided in the outer surface of the saw blade. Two of rollers 99 are carried by frame 74 and the third roller is mounted on a frame member 100 to engage the saw at its zenith relative to the work surface. These rollers are provided to prevent any wobble which might develop in the large diameter blades while a piece of insulation is being cut. The large diameter blades carry insert teeth 101 which shave off the outer portions of the block of insulation thereby shaping the outer periphery of the largest segment. Thus, the thrust roller carried by member 100 may be employed as no part of the block of insulation passes over the outer surface of the O. D. saw blade.

Fig. 9 illustrates the arrangement used for small diameter blades. With blades of less than 6 inches in diameter, the blade may be thin enough to cut a narrow kerf and yet sufficiently rigid that it will withstand considerable pressure from support or drive rollers without distortion. Due to the space limitations within the half segment of a blade which is of 6 inches or less in diameter, it is also desirable to reduce as far as possible the size of the roller which is positioned inside of the blade. As it is desirable to maintain the drive rollers of the same diameter used in the largest saws so that the parts will, insofar as possible, be interchangeable and to maintain a large area of frictional contact between the drive rollers and blades, rollers 102 and 103 which function as support rollers in the other assemblies are here provided with pulleys and a belt 104 (shown in dashed outline) is threaded about these pulleys to provide the driving force for the saw. An idler pulley 105 is journaled in frame 74 at a point below the drive pulleys 102 and 103 in a manner to form a loop in the drive belt between drive pulleys 102 and 103 so that the drive belt will engage substantially a half segment of each of the drive pulleys. An idler roller 106 is carried by arm 107 which is pivotally mounted on frame member 74 and engages the inner surface of blade 12. Roller 106 is urged against blade 12 by pivoting arm 107 about its pivot under the influence of tension spring 108.

With the small diameter saws such as illustrated in Fig. 9 the arcuate length of the cut being made is small as compared to the arcuate length of the cut made by the intermediate and O.D. saws. Therefore, the endwise thrust exerted on the saw in cutting insulating material is much less. Spring 108 may be designed to maintain the blade in firm contact with drive rollers 102 and 103 under the load conditions exerted upon this saw blade without causing any appreciable distortion of the blade and this design is therefore preferred for the small diameter saws although the arrangement utilized in the intermediate size saws may be employed by reducing the size of the drive rollers and pulleys. The drive and idler rollers are journaled for rotation about an axis which is inclined to a plane containing the axis of rotation of the saw blade as in the intermediate and large diameter assemblies in order to maintain the saw blade against thrust rollers 109.

Referring to Fig. 3 it will be noted that space is provided for four saws and a milling tool. The table may be designed to accommodate as many saws as required but generally a milling tool and four saws are sufficient in cutting insulating material as it is usually desirable to have in inch or more of thickness in the finished segment of the insulating material.

In operation, the operator will select saws for making the required cuts and mount the saws on angle members 76 and 77 with the smallest saw blade positioned to make the first cut. The intermediate sizes of blades are positioned behind the small blade and the O. D. blade follows the intermediate blades so that the innermost segment will be cut from the block first and then the next innermost segment and so on until the outer segment is fabricated last. The operator may stand in back of the machine and reach through the large diameter saw blades to grasp the smaller sections and withdraw them from the machine while the larger sections are being cut. This arrangement of blades allows full utilization of the feeding guide 24 as explained above. Generally, the uncut blocks of material are fed into the machine with their adjacent ends in abutment so that it is only necessary to urge the block farthest away from the saw blades toward the saw blades to continuously feed the blocks into the saw blades. It will be appreciated that the smaller segments will also be moved along the table after they have been sawed by the piece of material which is being moved into the saws and where several blocks are being cut it is not necessary to reach into the O. D. saw and remove the smaller segments. As the segments leave the O. D. saw, they are engaged by the receiving guide and as they move clear of the O. D. saw blade, the operator can move them from the receiving guide. If desired, the blocks may be caused to move on to an assembly line for transmittal to another station but as the segments are of different size it is usually desirable to manually separate them at this point.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A saw blade assembly comprising, a frame, a tubular saw blade having inner and outer circumferential faces, a plurality of support rollers carried by the frame and arranged to be in rolling contact with at least one of said faces of the blade to rotatably mount the blade on the frame, a pair of laterally spaced apart rollers respectively in rolling engagement with said inner and outer circumferential faces, means mounting said pair of rollers on said frame for simultaneous movement toward and away from the faces engaged by each, and means for moving each of said pair of rollers into engagement with the respective faces engaged by each and urging each roller into frictional engagement with the blade and for rotating at least one of said pair of rollers thereby maintaining the pair of rollers in rolling engagement with the blade while driving the same.

2. A power saw comprising, a frame, a tubular saw blade having inner and outer circumferential faces, a plurality of support rollers carried by the frame and arranged to rotatably support the saw blade by bearing thereagainst, a roller support rotatively mounted on the frame, a pair of laterally spaced apart rollers carried by said roller support and positioned to be urged respectively into rolling contact with said inner and outer faces at closely adjacent points upon rotation of the roller support, means for applying a force to the roller support to rotate the same and to one of said pair of rollers to rotate such roller thereby maintaining the pair of rollers in rolling engagement with the blade while driving the blade.

3. A saw blade assembly comprising, a frame, a tubular saw blade having inner and outer circumferential faces, a plurality of support rollers carried by the frame and arranged to rotatably support the blade by bearing thereagainst, a pair of laterally spaced apart drive rollers, a plate carrying said rollers and rotatably connected to the frame for moving the drive rollers respectively into rolling engagement with the inner and outer faces of said blade, pulleys connected to said drive rollers, and a belt threaded under one pulley and over the other pulley in a manner that tensioning the belt provides a torque tending to rotate the plate in a direction to move the drive rollers into engagement with the blade while driving the pulleys whereby the force tending to rotate the plate will increase as the load on the saw is increased.

4. The saw assembly of claim 3 wherein all of said rollers are arranged about less than 180° of the circumference of the saw blade.

5. A power saw comprising, a frame, a tubular saw blade having inner and outer circumferential faces and an annular metal body, a pair of support rollers carried by the frame in rolling contact with one of said circumferential faces, both of said support rollers being disposed along a circumferential portion of the saw blade constituting less than one-half thereof, a plate, a pair of drive rollers journaled in said plate, said plate being pivotably connected to said frame for arcuate movement of said drive rollers laterally about an axis extending longitudinally of the blade and intersecting the annular body of said saw, said drive rollers being laterally spaced apart a distance slightly greater than the thickness of the saw blade and receiving the saw blade therebetween so that the drive rollers can be moved toward the respective circumferential faces to be contacted thereby, and means for applying a force to the plate to rotate the drive rollers toward the respective faces contacted thereby and a driving force to said drive rollers to rotate the blade whereby the drive rollers are maintained in frictional engagement with the blade while driving the same.

6. The saw of claim 5 wherein the rotational axis of at least one of the rollers intersects a plane containing the rotational axis of the blade and is inclined with respect to said plane so that upon rotation of such roller and the blade, the latter is urged axially in a direction away from its cutting edge, and wherein thrust rollers are carried by the frame in rolling contact with an endwise surface of the blade and along said circumferential portion to oppose the movement of the blade in said direction.

7. A power saw comprising, a frame, an annular saw blade having a relatively short longitudinal dimension, a plurality of rollers carried by the frame and arranged about an arc of less than 180° having a radius such that the rollers rotatably position the saw blade by bearing thereagainst, the axis of rotation of said rollers intersecting a diametral plane of the saw blade and inclined therefrom in the direction of rotation of the saw blade at the point of engagement of the roller and blade, thrust rollers carried by the frame and opposing the tendency of the saw to move along its axis of rotation due to its engagement with the positioning rollers, and means for rotating the saw blade.

8. In a power saw having a tubular saw blade rotatably positioned in a framework by a plurality of supporting rollers, the improvement which resides in the combination therewith of a pair of drive rollers, means pivoted to said framework and carrying said drive rollers for arcuate movement toward and away from said blade, said rollers being laterally spaced apart and disposed to receive a portion of the saw blade therebetween, and means applying a pivoting force to the drive roller carrying means and a drive force to the drive rollers to maintain the drive rollers in frictional engagement with the blade while driving the same.

9. In a power saw having a tubular saw blade rotatably positioned in a framework by a plurality of supporting rollers which are arranged about an arcuate segment of less than 180°, the improvement which resides in the combination therewith of a pair of drive rollers pivotally connected to the framework for lateral movement about an axis which is positioned within said segment and extending longitudinally of the saw blade, said rollers spaced apart a distance to receive a portion of the saw blade therebetween, a pulley on each of the drive rollers and a continuous belt threaded about both of the pulleys in a manner to provide torque tending to pivot the drive rollers about said axis and toward rolling engagement with the saw blade while causing said drive rollers to rotate whereby the force tending to so pivot the drive rollers will increase as the load on the saw blade is increased.

10. A power saw comprising, a frame, a tubular saw blade, supporting rollers carried by the frame and in rolling contact with the inner and outer circumferential faces of the blade along less than one-half of the circumference of the blade to rotatably support the saw blade by bearing thereagainst, at least one of said supporting rollers being a power driven driving roller, and thrust rollers carried by the frame in rolling contact with an endwise surface of the blade and also positioned within said one-half circumference of the blade, each supporting roller having a rotational axis intersecting a plane containing the rotational axis of the saw blade and inclined therefrom with the ends of the support rollers nearest the toothed edge of the saw blade leading the other ends of the support rollers in the direction of rotation of the saw blade to urge the saw blade against the thrust rollers during rotation of the saw blade.

11. The saw of claim 10 wherein the support rollers are surfaced with a resilient material having a high coefficient of friction.

12. A power saw comprising, a frame; an annular saw blade; a plurality of rollers carried by the frame and arranged about an arc of less than 180° having a radius such that the rollers rotatably position the saw blade by bearing thereagainst; said rollers comprising a pair of trunnions having wear faces of resilient material, a pair of drive rollers having wear faces of resilient material spaced apart a distance to receive a portion of the saw blade and carried by shafts journaled in a rotatable plate which is pivoted about an axis that extends through the center line of a portion of the saw, and thrust rollers engaging the back edge of the saw blade; the rotational axis of each of the trunnions and drive rollers intersecting a diametral plane of the saw blade and inclined therefrom in the direction of rotation of the saw blade at the point of engagement of the roller and blade; each of said drive roller shafts provided with a pulley; and a continuous belt threaded about a prime mover and under one pulley and over the other pulley in a manner to provide a torque arm tending to rotate the rotatable plate while driving the pulleys; whereby the force tending to rotate the rotatable plate will increase as the load on the saw is increased.

13. A power saw comprising, a frame, a tubular saw blade having an annular metal body and inner and outer circumferential faces, a plurality of support rollers carried by the frame in rolling contact with one of said circumferential faces, said rollers disposed along a circumferential portion of the saw blade constituting less than one-half thereof, a plate, a pair of rollers journaled in said plate and laterally spaced apart a distance slightly greater than the thickness of the blade and receiving the blade therebetween, at least one of said pair being a drive roller, said plate being pivotally connected to the frame for arcuate movement of the rollers carried thereby laterally about an axis extending longitudinally of the blade and intersecting the annular body of the saw so that the rollers carried by the plate can be moved towards the respective circumferential faces to be contacted thereby, and means for applying a force to the plate to rotate same and move the rollers carried thereby toward the respective faces of the blade and a driving force to said drive roller to rotate the blade whereby the rollers carried by the plate are maintained in frictional engagement with the blade while at least one of said plate rollers is driving the blade.

14. A power saw comprising a frame, an annular saw blade having a relatively short longitudinal dimension, a plurality of rollers carried by the frame and arranged about an arc of less than 180° having a radius such that the rollers rotatably position the saw blade by bearing thereagainst, at least one of said rollers having its axis of rotation intersecting a diametral plane of the saw blade and inclined therefrom in the direction of rotation of the saw blade at the point of engagement of the roller and blade, means carried by the frame and engaging the saw blade in the same 180° arc as the support rollers and opposing the tendency of the saw to move along its axis of rotation due to its engagement with an inclined roller, said rollers and said means providing the sole support for the blade and maintaining it in place against the tilting force caused by a workpiece being fashioned by the half of the blade not in contact with the rollers, and means for rotating the saw blade.

15. A power saw comprising a frame, an annular saw blade having a relatively short longitudinal dimension, a plurality of rollers carried by the frame and arranged about an arc of less than 180° having a radius such that the rollers rotatably position the saw blade by bearing thereagainst, at least one of said rollers having its axis of rotation intersecting a diametral plane of the saw blade and inclined therefrom in the direction of rotation of the saw blade at the point of engagement of the roller and blade, means carried by the frame and opposing the tendency of the saw to move along its axis of rotation due to its engagement with an inclined roller, and means for rotating the saw blade.

References Cited in the file of this patent

UNITED STATES PATENTS

| 166,718 | Pierce et al. | Aug. 17, 1875 |
| 397,727 | King | Feb. 12, 1889 |
| 400,991 | Abbott | Apr. 9, 1889 |
| 499,162 | Emerson | June 6, 1893 |
| 581,183 | Tope et al. | Apr. 20, 1897 |
| 1,174,777 | Tomlinson | Mar. 7, 1916 |
| 1,507,460 | Carroll | Sept. 2, 1924 |
| 1,607,784 | Spangler | Nov. 23, 1926 |
| 1,679,884 | Thomas | Aug. 7, 1928 |

FOREIGN PATENTS

| 1,566 | Great Britain | June 28, 1860 |
| 1,398 | Great Britain | May 16, 1870 |
| 371,649 | Germany | Mar. 17, 1923 |
| 539,126 | Germany | Nov. 25, 1931 |
| 651,199 | Germany | Oct. 8, 1937 |